United States Patent [19]

Arai et al.

[11] Patent Number: 4,595,934
[45] Date of Patent: Jun. 17, 1986

[54] THERMAL RECORDING HEAD

[75] Inventors: Shoji Arai, Kyoto; Izumi Okamoto, Osaka; Masayoshi Mihata, Hirakata, all of Japan

[73] Assignee: Matsushita Electric Industrial Co. Ltd., Osaka, Japan

[21] Appl. No.: 617,942

[22] Filed: Jun. 6, 1984

[30] Foreign Application Priority Data

Jun. 9, 1983 [JP] Japan ................................. 58-103688

[51] Int. Cl.⁴ ............................................... B41J 3/20
[52] U.S. Cl. ................................ 346/76 PH; 219/543; 338/308
[58] Field of Search ................ 346/76 R, 76 PH, 155, 346/139 C; 219/216 PH, 543, 539; 338/307-309; 400/120

[56] References Cited

U.S. PATENT DOCUMENTS 4,464,669 8/1984 Sekiya et al. .................... 346/76 PH

FOREIGN PATENT DOCUMENTS

0055259 4/1983 Japan .............................. 346/76 PH

Primary Examiner—E. A. Goldberg
Assistant Examiner—A. Evans
Attorney, Agent, or Firm—Spencer & Frank

[57] ABSTRACT

An improved thermal head for thermal recording includes an array of a plurality of heat generator elements arranged in a direction first, and a plurality of semiconductor chips each thereof including a plurality of transistors for selectively energizing the plural heat generator elements. An array of electrode terminals including the individual electrode terminals of the plurality of transistors each thereof being connected to one electrode of each of the plurality of heat generator elements are formed on one of the major surfaces of each of the semiconductor chips in a second direction substantially perpendicular to the first direction of the heat generator element array. The thermal head further comprises a flexible film associated with each of the semiconductor chips and having a slot or recess surrounding the electrode terminal array. One of the major surfaces of the flexible film is placed on the major surface of the semiconductor chip on which the electrode terminal array is disposed, and a plurality of leads having one end thereof connected respectively to the electrode terminals are disposed on the other major surface of the flexible film substantially in parallel with the heat generator element array. By virtue of the above structure, the thermal head is suitable for thermal recording with a high recording density and can be manufactured at a low cost.

17 Claims, 11 Drawing Figures

THERMAL RECORDING HEAD

BACKGROUND OF THE INVENTION

1. Field of the Invention

This invention relates to thermal recording heads used in thermal recording, and more particularly relates to a semiconductor device useful for improving the recording density of the recording section of a thermal recording system of the line printer type which uses an array of many heat generator elements. It also relates to a thermal recording head in which such a semiconductor device is incorporated to effect thermal recording with a high recording density.

A thermal recording system is now widely employed in the recording section of various kinds of recorders as a recording means permitting easy maintenance. Both a high recording speed and a high recording density are now required for such a thermal recording system.

In order to increase the recording speed of a thermal head for use in thermal recording system of the line printer type, it is effective to cause simultaneous energization of a number of selected heat generator elements. To satisfy the above requirements, a thermal head of the line printer type has recently been developed and used in which semiconductor devices each thereof including a plurality of transistors and a shift register for energizing the individual heat generator elements are combined with the heat generator elements. Such a thermal head will be called hereinafter a thermal head of the shift register type.

2. Description of the Prior Art

Figure 1:
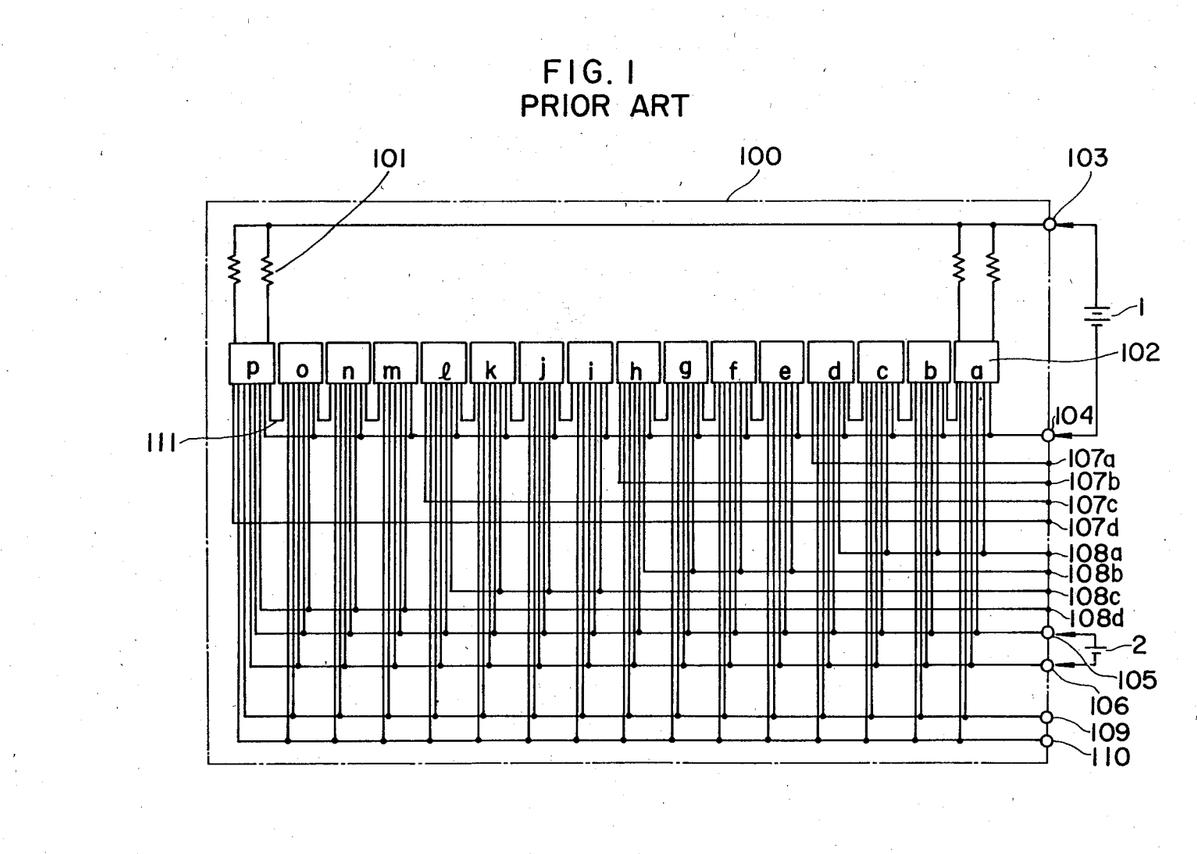
FIG. 1 is an explanatory drawing for illustrating a general method for providing electrical connections in a thermal recording thermal head of the shift register type.

FIG. 1 shows an exemplary form of electrical connection of such a thermal head. In FIG. 1, the thermal head, which is generally designated by reference numeral 100, includes heat generator elements 101 and semiconductor devices 102a to 102p. Reference numerals 103 and 104 designate terminals for connection to the plus and minus power supply terminals, respectively, of a power source 1 provided for energizing the heat generator elements 101, and reference numerals 105 and 106 designate terminals for connection to the plus and minus power supply terminals, respectively, of a power source 2 provided for driving the semiconductor devices 102a to 102p.

After these power sources 1 and 2 have been connected to the terminals 103, 104 and 105, 106, respectively, when driving voltages are applied to terminals 107a to 107d, 108a to 108d, 109 and 110 at the required timing, the heat generator elements 101 can be selectively energized as desired in accordance with a picture signal.

Figure 2:
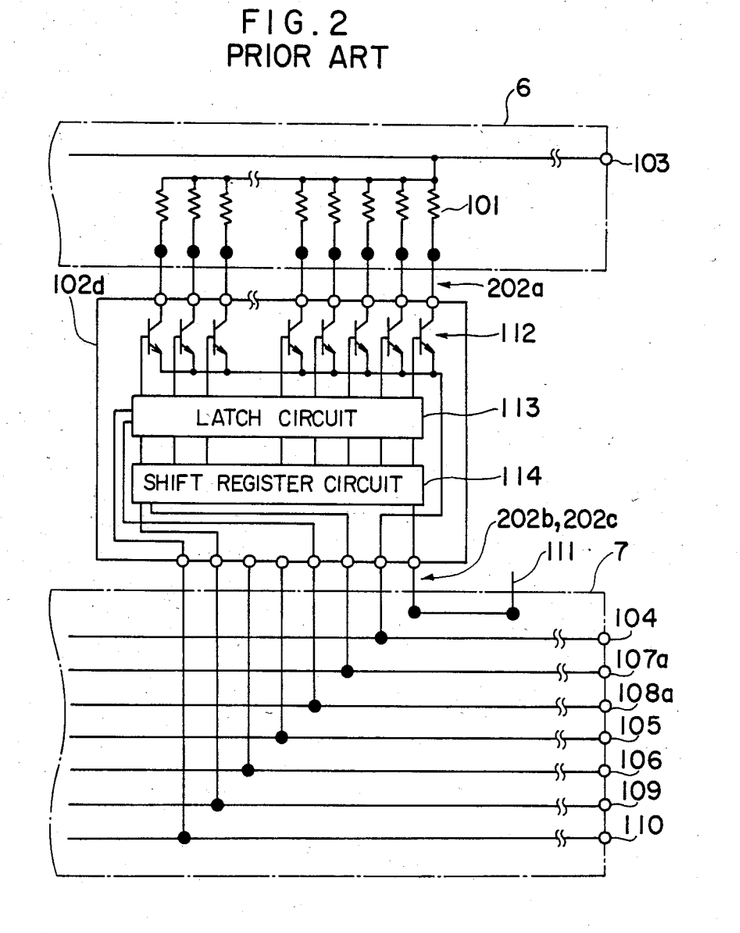
FIG. 2 is an explanatory drawing for illustrating a part of the electrical connections associated with a specific semiconductor device among those shown in FIG. 1 and also for illustrating how the thermal head according to the present invention is constructed.

FIG. 2 shows the electrical connection and structure of the semiconductor device 102d taken, by way of example, from among the semiconductor devices 102a to 102p shown in FIG. 1. Referring to FIG. 2, the semiconductor device 102d includes a plurality of transistors 112 connected in series with the heat generator elements 101 and the power source 1 for energizing the heat generator elements 101, a latch circuit 113 temporarily storing a picture signal which turns on-off these transistors 112, and a shift register circuit 114 for applying the picture signal to the latch circuit 113.

In the thermal head of the shift register type illustrated in FIGS. 1 and 2, the individual heat generator elements 101 are energized in a manner as described hereunder.

Referring again to FIG. 1, a picture signal is applied to the terminal 107a while applying a clock signal to the terminal 109. After transferring the picture signal between the shift registers of the respective semiconductor devices 102d to 102a in the order of the semiconductor devices 102d→102c→102b→102a through U-connections 111, a strobe signal is applied to the terminal 110 to apply the picture signal, which has been transferred and stored in the respective shift registers, to the latch circuits 113. Then, when an enable pulse is applied to the terminal 108a, the transistors 112 connected to the heat generator elements 101, which are selected to be energized among those connected to the semiconductor devices 102a to 102d, are turned on according to the picture signal stored in the latch circuits 113. Then, through each of the heat generator elements 101 to be energized, a current flows through a path from the plus power supply terminal of the power source 1→ a heat generator element 101→ a conductive transistor 112 to the minus power supply terminal of the power source 1 only during the period of application of the enable pulse.

It is well known that, through such heat generator elements energization as described above, a thermal head of the line printer type having many heat generator elements can effect high speed thermal recording. Therefore, any further detailed description of the heat generator elements energization is unnecessary.

The manner of energization of the heat generator elements of a thermal head of the shift register type as described above differs depending on the internal circuit structure of the semiconductor devices, and the configuration of the electrical connections shown in FIG. 1 is modified to have various forms taking into consideration the factors including the condition of using the thermal head in addition to the circuit function of the semiconductor devices. Irrespective of such various configurations of the electrical connections, the thermal head of the above described type is featured in that the circuit of each of the semiconductor devices for energizing the heat generator elements includes at least a plurality of transistors and a shift register circuit.

It will be seen from the above description that the thermal head of the shift register type has the circuit structure most useful for increasing the speed of thermal recording. However, it is in no way easy to manufacture a thermal head capable of thermal recording with a high recording density such as 16 dots/mm which has been attained by an electrostatic recording system.

The principal reasons therefor are as follows:

(1) It is technically difficult to provide electrical connections between the individual electrodes of the heat generator elements arrayed in line with a high density and the terminals of the heat generator elements energizing transistors in the semiconductor devices; and (2) it is also technically difficult to form the multilayer interconnections exemplified in FIG. 1 which are required for the connection of the terminals of the semiconductor devices other than those connected to the individual electrodes of the heat generator elements.

Besides the two reasons described above, it is also an important problem to make heat generator elements which are arranged in line with a high recording density such as 16 dots/mm and yet are not destroyed by the application of energy thereto which energy is required for the formation of a color picture. It is not too much to say that a thermal recording thermal head of the line printer type capable of thermal recording with a recording density of 16 dots/mm has not yet been sold in the market for the reasons (1) and (2) described above.

Figure 3:
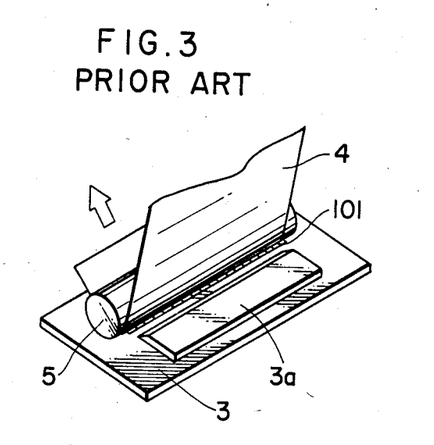
FIG. 3 is a perspective view showing the external appearance of a prior art high recording density thermal head used in the present invention.

Further, a thermal head having an external appearance as shown in FIG. 3 is preferred when such a high recording density thermal head is used in the recording section.

In FIG. 3, reference numerals 3, 4 and 5 designate a base plate supporting the heat generator elements of the thermal head, a thermosensitive recording paper, and a recording paper feed roller, respectively. Referring to FIG. 3, the thermosensitive recording paper 4 is pressed by the recording paper feed roller 5 against an array of the heat generator elements (not shown) arranged in line on the base plate 3 and is fed in the direction of the arrow, and the thermal recording thereon is effected by the selective energization of the heat generator elements array. A cover 3a covers a portion of the base plate 3 supporting the heat generator elements, and, beneath this cover 3a, a plurality of semiconductor devices having a circuit function as described with reference to FIG. 2 are arranged in a single line or plural lines substantially in parallel with the array of the heat generator elements.

The thermal head having an external appearance as shown in FIG. 3, in which the plural semiconductor devices are arranged substantially in parallel with the heat generator element array only on one side of the heat generator element array and the cover 3a is provided for the purpose of mechanical protection of the semiconductor devices, is advantageous in that the portion of the recording paper 4 under recording is readily visible and the recording section can be made compact. However, if such an external appearance is taken up as one of the requirements for the thermal head, it becomes all the more difficult to manufacture a thermal head capable of thermal recording with a high recording density.

Figure 4:
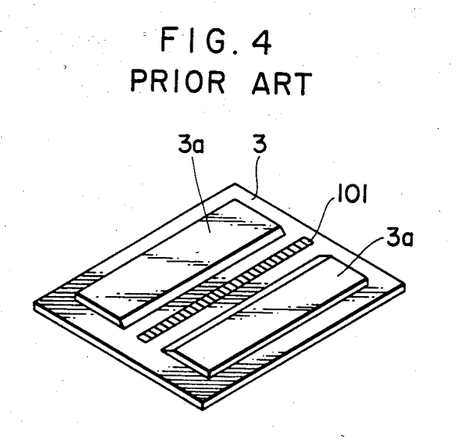
FIG. 4 is a perspective view showing the external appearance of a prior art high recording density thermal head.

With the structure of a thermal head having semiconductor devices arranged on both sides of the heat generator element array as shown in FIG. 4, it has been possible to develop a thermal head capable of thermal recording with a high recording density of 16 dots/mm. However, in the case of thermal heads which have an external appearance shown in FIG. 3 and which are currently in production, the highest recording density is only 10 dots/mm.

In addition, as an example of thermal heads having an external appearance as shown in FIG. 4, a thermal head having a recording density of 12 dots/mm is known in which semiconductor devices of the shift register type are arranged under one of the mechanical protecting covers 3a and a diode array is arranged under the other of the mechanical protecting covers 3a.

It is an object of the present invention to provide the structure of a thermal head employing semiconductor devices useful for constructing a line printer type thermal head of the shift register type having the external appearance shown in FIG. 3 and capable of thermal recording with a high recording density of 16 dots/mm.

Another object of the present invention is to manufacture such semiconductor devices and thermal head as described above at a low cost.

SUMMARY OF THE INVENTION

According to the present invention, the electrical connections between the heat generator elements and the semiconductor devices for energizing the heat generator elements and the multilayer interconnections for the driving input terminals of the semiconductor devices, which are important for constructing a high recording density thermal head, are realized by a semiconductor packaging method, which is known, for example, as a film carrier method or a tape automated bonding (TAB) method. Such semiconductor packaging methods are employed not only in the manufacture of thermal heads of the shift register type but also in the manufacture of thermal heads of the diode matrix type using a diode array as the semiconductor devices for energizing the heat generator elements.

In the present invention, these well-known methods are employed to arrange semiconductor devices and a thermal head so as to construct a thermal head of the shift register type capable of thermal recording with a high recording density.

In accordance with one aspect of the present invention, there is provided a thermal head for thermal recording including an array of heat generator elements arranged in line on a base plate, and a semiconductor chip having a square or rectangular shape including a plurality of transistors for selectively energizing the heat generator elements and having an array of terminals arranged on one of the major surface thereof in a direction substantially perpendicular to the heat generator element array, the array of terminals on the major surface of the semiconductor chip including at least the individual electrode terminals of the plural transistors to be connected to the electrodes on one side of the plural heat generator elements, respectively, a flexible film associated with each semiconductor chip by having a slot or recess, which surrounds the terminal array on the major surface of the semiconductor chip, and one of the major surfaces of the flexible film placed on the major surface of the semiconductor chip on which the terminal array is disposed, and a plurality of lead wires disposed on the above major surface or the other major surface of the flexible film substantially in parallel with the heat generator element array and having respective ends thereof connected to the electrode terminals.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

The present invention will now be described in detail with reference to the accompanying drawings.

Figure 5:
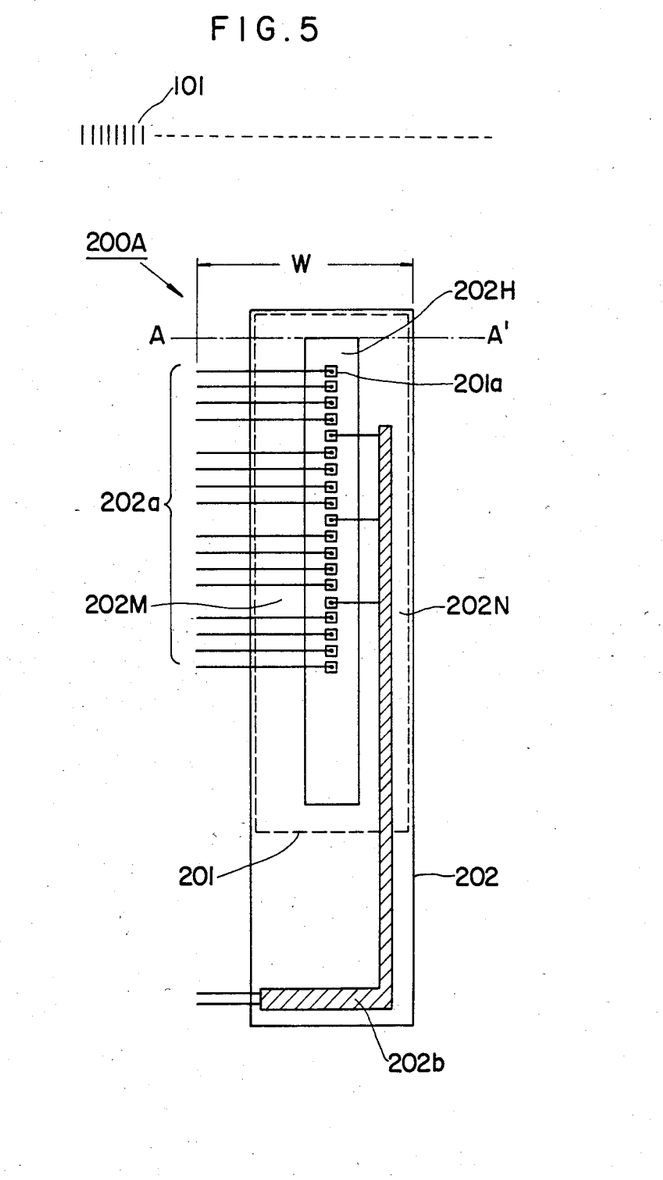
FIGS. 5, 6A and 6B are schematic plan views showing the structure of the semiconductor device of various embodiments of the present invention.

FIG. 5 is a schematic plan view showing principal parts of the semiconductor device of an embodiment of the present invention.

Referring to FIG. 5, the semiconductor device is generally designated by reference numeral 200A and it includes a semiconductor chip 201 having a plurality of transistors, a shift register, etc. incorporated therein and also having terminal pads 201a provided thereon so that the ends of leads going out from the semiconductor chip 201 are attached thereto, and a flexible film 202 of an electrically insulating material having leads 202a and 202b formed thereon.

As shown in FIG. 5, the semiconductor chip 201 is generally in the form of a semiconductor silicon chip of a rectangular or square shape. In the present invention, the location of the pads 201a, to which the ends of the leads going out from the semiconductor chip 201 are attached, is limited to the area of a slot or a recess 202H provided in the flexible film 202 which is placed so that it contacts the major surface of the silicon chip 201 on which the pads 201a are disposed. In this case, the portion of the flexible film 202 extending beyond the upper side of the slot 202H in FIG. 5 (the portion extending upwardly beyond the line A—A' in FIG. 5) is not necessarily indispensable. Thus, the recess 202H may be formed if such a portion is cut away from the flexible film 202.

The pads 201a disposed on the semiconductor chip 201 at the location corresponding to the slot 202H and in registration therewith include those for connecting the transistors 112 (FIG. 2) to the individual electrodes of the heat generator elements 101 and those for connecting the transistors 112 to common terminals. As shown in FIG. 5, the pads 201a are arranged in an array substantially in parallel with the elongated longitudinal sides of the slot 202H and are spaced apart from each other by a predetermined distance. The leads 202a and 202b are formed on a major surface of the flexible film 202, the other major surface of which contacts the major surface of the semiconductor chip 201. The plural leads 202a (16 leads in the case of FIG. 5) for connecting the transistors 112 to the individual electrodes of the heat generator elements 101 are formed on one (202M) of the strip portions of the flexible film 202 defined on both sides of the slot 202H and extend in a direction substantially perpendicular to the longitudinal direction of the strip portion 202M, that is, substantially in parallel with the array of the heat generator elements 101. These leads 202a are connected at one end thereof to the pads 201a, respectively.

The lead 202b providing common terminal connections for the heat generator elements energizing transistors 112 in the semiconductor chip 201 is formed on the other strip portion 202N. At one end of the lead 202b, the lead 202b branches as shown in FIG. 5 and the branches of the lead 202b are connected respectively to the common terminal pads 201a. Thus, since the common lead 202b is formed on the strip portion 202N of the flexible film 202 to have a sufficient width and its end is branched to be connected to the common terminal pads 201a, respectively, the voltage drop across the common lead 202b and that across the connected portions of the branches can be easily reduced to a level which would not adversely affect the operation of the semiconductor device, even if all of the currents flowing through the heat generator elements energizing transistors 112 (FIG. 2) in the semiconductor chip 201 should concentrate at the above-described portions.

Although only the leads for connection to the terminals of the heat generator elements energizing transistors 112 in the semiconductor chip 201 of the semiconductor device are shown in FIG. 5, other leads for the power supply terminals for feeding the semiconductor device and for the terminals of the signal lines are also formed in a manner similar to the formation of the common terminal lead 202b. Additional pads for the above-mentioned terminal connections (not shown in FIG. 5) are formed, for example, in a lower area or in upper and lower areas with respect to the pads 201a shown in FIG. 5, and the leads terminating at such pads are also supported on the flexible film 202. The shapes of these pads and leads are determined taking into consideration the factors including the manner of internal connections to the terminals of the thermal head itself and the arrangement of the elements in the semiconductor chip.

Figure 6A:
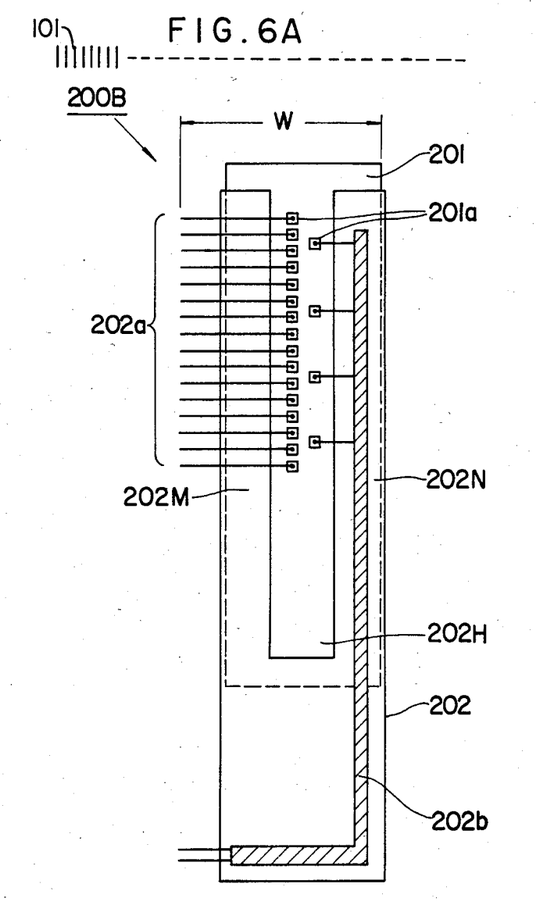
Figure 6B:
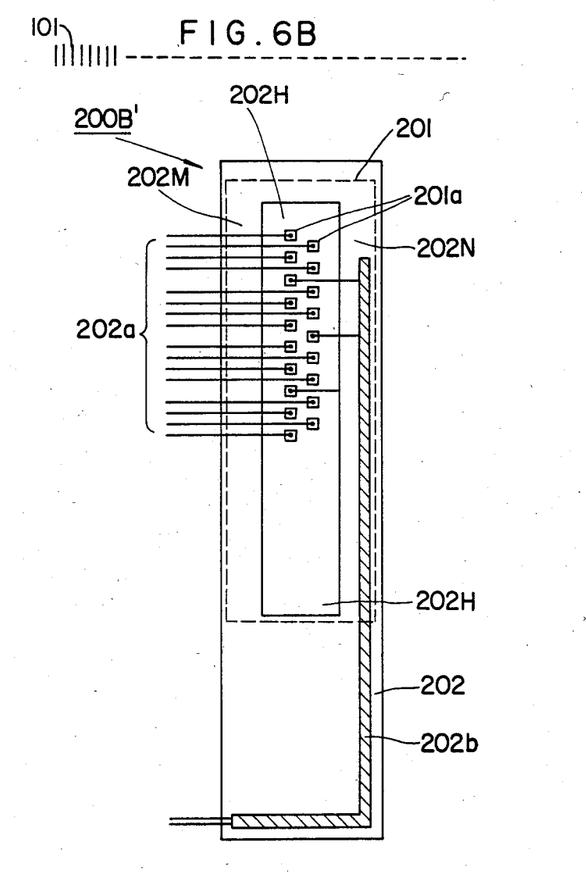

FIGS. 6A and 6B show semiconductor devices 200B and 200B', respectively, which are modified forms of the semiconductor device 200A shown in FIG. 5. These semiconductor devices 200B and 200B' are the same as the semiconductor device 200A except that the pads 201a for connection to the one-side ends of the leads 202a and 202b, respectively, are disposed in two rows in the longitudinal direction of a recess or a slot 202H. Therefore, the same reference numerals are used in FIGS. 6A and 6B to designate the same or equivalent parts appearing in FIG. 5 and any further description of such parts will be dispensed with.

The semiconductor device for use in the high recording density thermal head according to the present invention is featured by having configurations such as shown in FIG. 5, 6A or 6B or by having slight modifications of the configurations illustrated in FIGS. 5, 6A and 6B. Each of the semiconductor devices shown in FIGS. 5, 6A and 6B is illustrated to incorporate 16 transistors for energizing the heat generator elements. If it is desired to increase the number of transistors, the longitudinal length of each of the semiconductor devices shown in FIGS. 5, 6A and 6B is elongated. It is a feature of the present invention in this case that the horizontal width W (including the leads 202a) of the semiconductor device remains unchanged in the above case, and further that the horizontal width W may be made to have a small value.

More concretely, if a plurality of semiconductor devices each thereof including 64 heat generator elements energizing transistors therein are arranged substantially in parallel with the array of heat generator elements to construct a thermal head capable of thermal recording with a high recording density of 16 dots/mm as shown in FIG. 3, it is necessary to provide electrical connections such as shown in FIG. 1 within a span of 4 mm per semiconductor device. On the other hand, in the case of the semiconductor devices shown in FIGS. 5, 6A and 6B, assuming that the horizontal width of the semiconductor chip is 2.5 mm and the length of the portions of the leads 202a and 202b, which extend outwardly from the side edge of the flexible film 202, is 1 mm, the total width W becomes 3.5 mm, which dimension sufficiently satisfies the above-mentioned limitation.

In the thermal head according to the present invention using the semiconductor devices described above, electrical connections between the heat generator elements supporting base plate 6 and the multilayer interconnection board 7 shown in FIG. 2 are formed by connecting thereto the open ends of the leads 202a, 202b, 202c, etc. of the semiconductor device 200A, 200B or 200B', 200C or 200D, which leads are formed as illustrated in FIG. 5, 6A or 6B, 7 or 8. In FIG. 2, the symbol "●" indicates the connection points of the above-mentioned leads on the heat generator elements supporting base plate 6 and the multilayer interconnection board 7.

The connections indicated by the large black dot symbol "●" are accomplished by the so-called outer lead bonding (OLB) technique used in the film carrier type or TAB type packaging method. The small circle symbol "○" shown at the periphery of the semiconductor device 102d in FIG. 2 indicates the connections in the slot or recess 202H in FIG. 5, 6A or 6B. Such connections are attained in a similar way by the so-called inner lead bonding (ILB) technique.

The above-mentioned two techniques called ILB and OLB are well known in the art. Also, as will be seen from FIG. 2, on the heat generator elements supporting base plate 6, the heat generator elements 101 and their common and individual electrodes may be provided, while, on the multilayer interconnection board 7, multilayer interconnection conductors arranged mostly in parallel with each other and with a relatively low density may be provided to provide electrical connections to the terminals 104 to 110 of the thermal head itself and also to provide a portion of the U-shaped connections 111. Thus, it will be understood that the semiconductor device according to the present invention can be used to easily manufacture, at a low cost, a thermal head of the line printer type capable of thermal recording with a high recording density.

Figure 7:
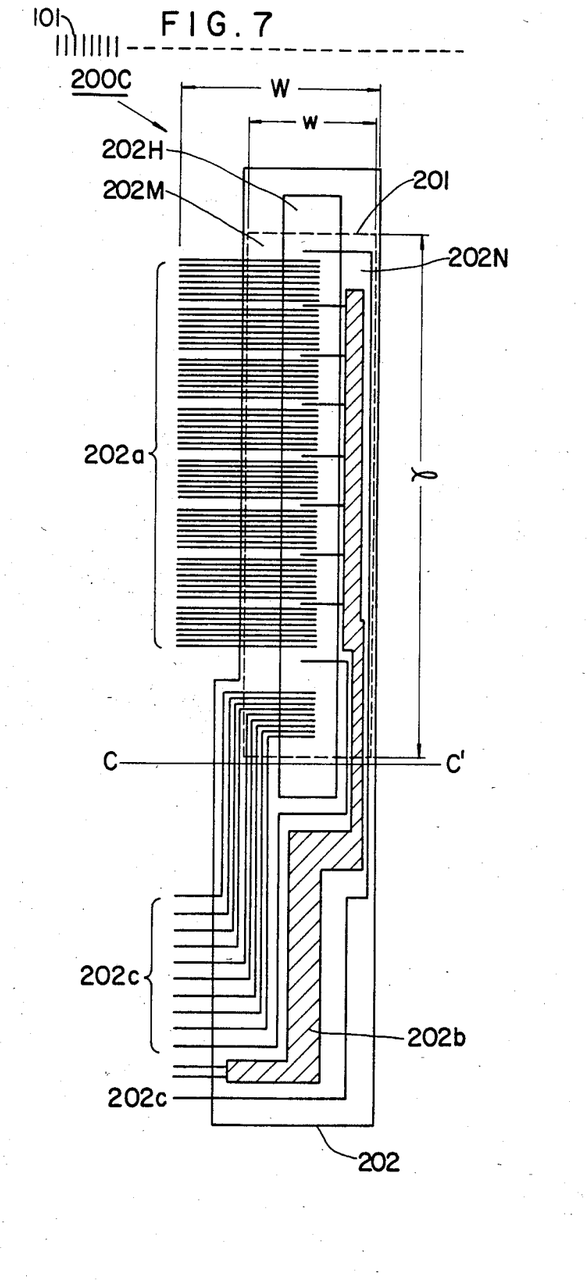
FIGS. 7 and 8 are schematic plan views showing the structure of the semiconductor device of further embodiments of the present invention.

FIG. 7 shows a concrete design example of a semiconductor device designated by 200C according to the present invention. When compared with the illustration of FIG. 5, FIG. 7 shows more clearly the leads for connection to the power supply terminals for feeding the semiconductor device and those for connection to the semiconductor driving input terminals.

Referring to FIG. 7, a semiconductor chip 201 incorporates 64 heat generator elements energizing transistors therein, and 64 leads 202a for connection to the respective corresponding 64 transistors are formed being supported on a strip portion 202M of a flexible film 202. To provide common terminal connections for these transistors, 7 branched leads are arrayed each one per 8 transistors and the 7 branched leads are connected in common to a wide common lead 202b formed on the other strip portion 202N of the flexible film 202. On the other hand, the central ends of the 64 leads 202a and the 7 branched leads are connected by the ILB technique to respective 71 pads (not shown for simplicity of illustration) arranged in line on the semiconductor chip 201. In the semiconductor device shown in FIG. 7, a total of 11 additional leads 202c are formed on the semiconductor chip 201 for connection to the power supply terminals for feeding the semiconductor device and to the semiconductor driving input terminals. The portions of these 11 leads 202c which are connected by the ILB technique to the respective corresponding pads are arranged in the same line with those of the leads 202a and 202b. One of the ILB-connection portions of the leads 202c is arranged at the uppermost area of the semiconductor chip 201 for the purpose of facilitating the design of the semiconductor chip 201 by arranging the picture signal input terminals and the output terminals of the semiconductor chip 201 respectively at both end portions of the heat generator elements energizing transistors. Further, in the semiconductor device shown in FIG. 2, the number of the leads 202c is 7 (except the common terminal of the transistors). In contrast, in the semiconductor device shown in FIG. 7, a function for further facilitating the energization of the heat generator elements is added to the existing functions of the semiconductor device, and, for this purpose, the number of the leads 202c is increased to 11. Such an improvement in the function of the semiconductor device includes, for example, an improvement in the function of the chip selection of the semiconductor device, an improvement in the function for adjusting the heat generator elements energizing pulse signal depending on the history of the energization of the heat generator elements (the function for controlling the thermal hysteresis in the energization of the heat generator elements), etc.

The leads 202a and 202b can be connected to the pads satisfactorily by the ILB technique if the pitch of the arrangement of the pads is of the order of 100 microns. Therefore, merely for the purpose of effecting the connections of the leads 202a, 202b and 202c, a required longitudinal length l of the semiconductor device becomes 8.2 mm, since the number of leads is $(64+7+11)=82$. However, in the design of the semiconductor device of the present invention, the longitudinal length l of the semiconductor device and the width w of the semiconductor chip 201 are selected as $l=9.5$ mm and $w=2.5$ mm, respectively.

Further, the width of the flexible film 202 is increased at its lower part to increase the number of the leads 202c to 11. Still in this case, the total width W of the semiconductor device can be made smaller than 4 mm. As will be seen from FIGS. 9A and 9B showing an example of the structure of an actual semiconductor package, the width W of a portion of the semiconductor device below the line C-C' shown, in FIG. 7 is not necessarily limited to be smaller than 4 mm, so that it is possible to further increase the number of the leads 202c as the function of the semiconductor device is promoted.

Figure 8:
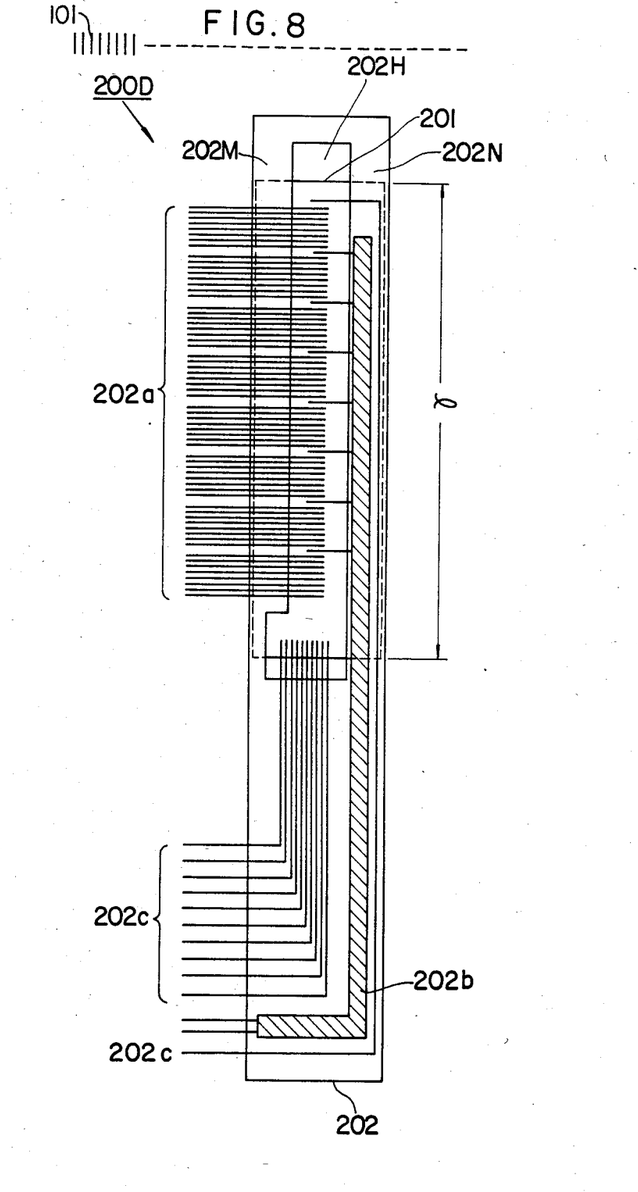

FIG. 8 shows another design example of a semiconductor device designated by 200D according to the present invention. In this design example shown in FIG. 8, the ILB connection pads for the leads 202c (not shown for simplicity of illustration) are arrayed in the horizontal direction for reducing the longitudinal length l of the semiconductor chip 201. For this purpose, the width of the lower portion of the slot 202H is slightly increased. Except for the above difference in the structure, the semiconductor device shown in FIG. 8 is the same as that shown in FIG. 7, so that identical reference numerals are used in FIG. 8 to designate the same or equivalent parts shown in FIG. 7 to dispense with any further description.

Figures 9A, 9B:
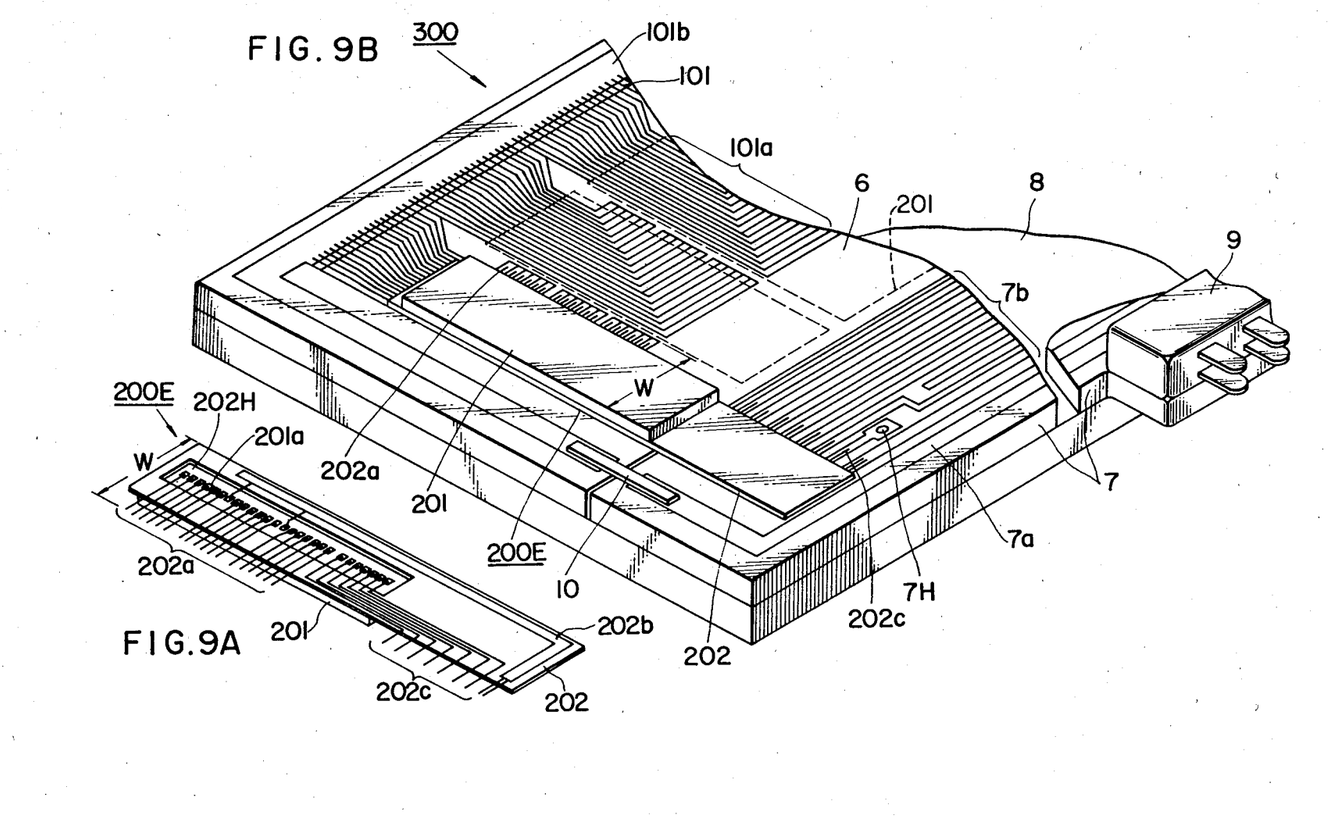
FIG. 9A is a perspective view of another example of the semiconductor device of the present invention.
FIG. 9B is a perspective view schematically showing the structure of the thermal head of an embodiment of the present invention which incorporates the semiconductor device shown in FIG. 9A.

The portions of the individual leads connected by the OLB technique in the respective semiconductor devices shown in FIGS. 7 and 8 are similar in structure, and these semiconductor devices may be used to construct a high recording density thermal head as shown in FIGS. 9A and 9B.

FIG. 9A is a perspective view of a semiconductor device 200E constructed according to the present invention, and FIG. 9B is a partially cut-away perspective view of a thermal head 300 constructed according to the present invention.

For easier understanding of the structure of the semiconductor device and the thermal head, FIGS. 9A and 9B illustrate an exemplifying construction in which 18 heat generator elements energizing transistors 112 are incorporated in a semiconductor chip 201, and 7 driving input terminals including power supply terminals to the semiconductor device 200E are provided.

Since the individual parts of the semiconductor device 200E have already been described, the same reference numerals are used in FIG. 9A to designate the same or equivalent parts shown in FIGS. 5 to 8 to dispense with any further description.

The thermal head 300 is constructed by mounting the heat generator elements, supporting base plate 6 and multilayer interconnection board 7 on a head support base 8 and then disposing the semiconductor device 200E thereon to provide electrical connections therebetween in a manner as described already with reference to FIG. 2. Thus, except for the differences in the number of the heat generator elements to be connected to a semiconductor device and the number of the leads to be connected to the semiconductor device, FIGS. 9A and 9B illustrate a construction which can be readily compared with that shown in FIG. 2.

Referring to FIG. 9B, an array of the heat generator elements 101, individual electrodes 101a of the respective heat generator elements 101 in the heat generator element array and a common electrode 101b of the heat generator element array are formed on the heat generator elements supporting base plate 6. On the other hand, a conductor 7a for connection to the heat generator elements energizing power source and other conductors 7b for making multilayer interconnections are formed on the multilayer interconnection board 7. These two kinds of conductors 7a and 7b are connected to a terminal connecting connector 9 mounted on a portion of the multilayer interconnection board 7 for connecting all the terminals of the thermal head 300 to external circuits. The semiconductor device 200E shown in FIG. 9A is turned upside down and placed on one of the heat generator elements supporting base plates 6. Then, the leads 202a and 202c of the semiconductor device 200E are connected to the electrodes 101a and conductors 7b, respectively, and a planar lead 10 is disposed to provide electrical connection between the common electrode 101b and the conductor 7a to complete the thermal head 300.

As has been explained in the previous description, the width W of the semiconductor device 200E does not change even if the number of the heat generator elements 101 to be connected to the semiconductor device 200E is increased. Also, as described already, the value of W can be limited to be smaller than 4 mm. Accordingly, if the semiconductor device is constructed to be capable of energizing 64 heat generator elements, a thermal head capable of thermal recording with a high recording density of 16 dots/mm and having an external appearance as shown in FIG. 3 can be easily manufactured according to the structure of the present invention shown in FIGS. 9A and 9B.

In FIG. 9B, most of the multilayer interconnection conductors 7b are arranged in parallel with the array of the heat generator elements 101. However, the picture signal input terminals 107a to 107d and the U-shaped connections 111 shown in FIG. 1 are required to be slightly modified so that the leads 202c having the same shape may be used to connect a plurality of semiconductor devices in series. In connection with the above-mentioned requirement, a through hole 7H provided at one of the leads 7b serves to provide electrical connections of the picture signal input terminals 107a to 107d to the connector 9.

To deal with these inconveniences, it is useful to have some of the conductors 7b on the multilayer interconnection board 7 formed in a multilayered pattern. Since, in this case, the pattern density of the conductors 7b can be made sufficiently low, it is possible to form the multilayer interconnection board 7 easily and at a low cost by using a two-sided printed-wiring board, for example. FIG. 9B does not show conductors arranged on the lower surface of the multilayer interconnection board 7. The utilization of the conductors arranged on the lower surface of the multilayer interconnection board 7 to reduce electrical resistance of the multilayer interconnection conductors for providing electrical connections to the heat generator elements energizing power source, the semiconductor device driving power source, etc. has the great effect of stabilizing the operation of the thermal head 300. Further, for this purpose, it is possible to employ printed-wiring boards stratified in three or more layers, for example, in place of the multilayer interconnection board 7.

As described in the foregoing, the present invention has such an important feature that a recording section of the type shown in FIG. 3 capable of thermal recording with a high recording density can be easily constructed. The present invention, which makes it possible to produce such a semiconductor device and a thermal head as described above industrially at a low cost, provides the following advantages.

Firstly, the semiconductor device according to the present invention can be designed so that a large current flowing concentratedly through the common terminals of the heat generator elements energizing transistors in the semiconductor device is divided to flow through a plurality of branches of the common conductor lead (for example, the lead 202b in FIG. 7) formed on the flexible film near the arrangement of the transistors. Therefore, the wiring on the semiconductor device may be designed to deal with a current capacity for each single branch thereby facilitating the design of the semiconductor device.

Secondly, by virtue of the structure of the semiconductor device shown in FIGS. 5 to 8 and the structure of the thermal head shown in FIG. 9B, it is required only to form the heat generator element array and the individual electrodes and common electrode thereof on the heat generator elements supporting base plate 6, and besides the patterns of these electrodes can have a very simple shape as illustrated in FIG. 9B. Further, these patterns may be formed in a single layer unlike the multilayered structure required for other semiconductor devices and thermal heads. As a consequence, the manufacturing cost of the heat generator elements supporting base plate 6 can be greatly reduced.

Thirdly, the multilayer interconnection structure shown in FIG. 1 can be completed by connecting the inexpensive multilayer interconnection board 7 to the semiconductor leads. Although the formation of such a multilayer interconnection structure itself has already been put into practice in a thermal head of the shift register type capable of thermal recording with a low recording density not exceeding 8 dots/mm, it is a great advantage brought by the present invention that such a well-known and well-refined manufacturing technique can be applied also to a thermal head capable of thermal recording with a high recording density of 16 dots/mm. In addition to the above-mentioned manufacturing technique, the high recording density thermal head according to the present invention can be produced by the use of any other manufacturing technique well known in the art. Comprehensively speaking, the present invention makes it possible to manufacture a high recording density thermal head industrially at a low cost.

Fourthly, the present invention makes it possible to produce thermal heads of the same structure but capable of thermal recording with various recording densities, respectively. For this purpose, it is required only to modify the pattern of the heat generator elements supporting base plate 6 shown in FIG. 9B.

The present invention is in no way limited to the particular embodiments described in the foregoing, and various changes and modifications may be made therein without departing from the scope of the appended claims.

For example, the lead connection pads of the semiconductor device have been positioned at a central portion between the short sides of the semiconductor chip in each of FIGS. 5 to 8. However, the position of the lead connection pads may be shifted to the left or right with respect to the short sides of the semiconductor chip thereby to further facilitate the design of the semiconductor device.

The leads 202a, 202b and 202c in FIG. 9A may be disposed on the lower surface of the flexible film 202 so that the electrically insulating flexible film 202 may prevent a short circuit failure from occurring between the leads 202a, 202b and 202c disposed on the flexible film 202 in the semiconductor device 200E shown in FIG. 9B and the conductors 101a, 7b, etc. in the thermal head 300 shown in FIG. 9B.

Further, the leads 202b and 202c may be made to depart from the flexible film 202 in the longitudinal direction thereof.

The division of the individual terminals (for example, the terminals 107a to 107d and 108a to 108d shown in FIG. 1) required for the circuit formation of the thermal head can be effected by modifying the pattern of the conductors 7b formed on the multilayer interconnection board 7 shown in FIG. 9B. Such a manner of division of the picture signal input terminals 107a to 107d is effective for substantially accelerating the picture signal transfer speed in the semiconductor device.

Also, it is possible to modify the position of the heat generator elements on the heat generator elements supporting base plate 6, the shape of the heat generator elements supporting base plate 6 itself, etc.

Various types of arrangement of the pads for providing input and output terminals for the semiconductor device have been shown as examples in the embodiments of the present invention. The lead connections or the ILB-connections to these pads can be made collectively. In this case, it is also possible to modify the arrangement of the terminals other than the individual terminals and common terminals of the heat generator elements energizing transistors in the semiconductor device so that the ILB-connection spots may be heated uniformly when such spots are heated by a heating tool which are used for making the ILB-connections.

It will be understood from the foregoing detailed description of the present invention that a compact thermal head having an array of heat generator elements arranged densely can be obtained easily by an industrially advantageous method, and that the present invention can thus greatly contribute to the realization of a thermal recording apparatus capable of thermal recording with a high recording density.

We claim:

1. A thermal head for use in thermal recording, comprising
   a base plate;
   an array of heat generator elements mounted on said base plate, said array extending in a first direction;
   a plurality of semiconductor chips mounted on said base plate and extending in said first direction, each of said semiconductor chips including a plurality of switching elements having respective electrode terminals thereof connected electrically to said heat generator elements, said electrode terminals being arranged to form a line on said semiconductor chip, said line extending in a section direction substantially perpendicular to said first direction;
   a plurality of conductors for applying a picture signal and power supply voltages to said switching elements; and
   a flexible film in contact with each of said semiconductor chips, each of said flexible films having conductive foil leads thereon for electrically connecting said conductors to said switching elements.

2. A thermal head for use in thermal recording, comprising
   a base plate;
   an array of heat generator elements mounted on said base plate, said array extending in a first direction;
   a rectangular semiconductor chip mounted on said base plate, said semiconductor chip including a plurality of transistors extending in said first direction for selectively energizing said heat generator elements;
   an array of electrode terminals disposed on a major surface of said semiconductor chip and extending in a second direction substantially perpendicular to said first direction, each electrode terminal of said array including at least individual electrode terminals of said plurality of transistors, and each of said transistors being connected to one electrode of each of said heat generator elements;
   a flexible film having a major surface thereof disposed on said major surface of the semiconductor chip, said flexible film having an opening therein in registration with said array of electrode terminals; and
   a plurality of leads disposed on a major surface of said flexible film and extending in a direction substantially parallel to said direction, each of said leads having one end thereof connected to an electrode terminal of said array of electrode terminals.

3. A thermal head for use in thermal recording, comprising
   a base plate;
   an array of heat generator elements mounted on said base plate, said array extending in a first direction;
   a semiconductor chip mounted on said base plate, said semiconductor chip including a plurality of switching elements extending in said first direction for selectively energizing said heat generator elements;

an array of electrode terminals disposed on a major surface of said semiconductor chip and extending in a second direction substantially perpendicular to said first direction, each electrode terminal of said array including at least individual electrode terminals and common electrode terminals of said plurality of switching elements, and each of said switching elements being connected to an electrode of each of said heat generator elements;

a flexible film having a major surface thereof disposed on said major surface of the semiconductor chip, said flexible film having an opening therein in registration with said array of electrode terminals; and a plurality of leads disposed on a major surface of said flexible film and extending in a direction substantially parallel to said first direction, one of said plurality of leads being connected to said common electrode terminals.

4. A thermal head for thermal recording as claimed in claim 2, wherein said electrode terminal array includes common electrode terminals of said transistors, and said common electrode terminals are connected to one of said leads.

5. A thermal head for thermal recording as claimed in claim 4 wherein said common electrode terminals and said individual electrode terminals are spaced apart from each other by a predetermined distance in said first direction.

6. A thermal head for thermal recording as claimed in claim 4, wherein said plurality of leads are connected to a common conductor formed on said flexible film.

7. A thermal head for thermal recording as claimed in claim 2, wherein signal input terminals for driving said transistors are disposed on said major surface of said semiconductor chip and are connected respectively to one end of leads having portions extending in said first direction.

8. A thermal head for thermal recording as claimed in claim 6, wherein said common conductor and said leads extend in the same direction from the same end of said flexible film.

9. A thermal head for thermal recording as claimed in claim 3, wherein said common electrode terminals and said individual electrode terminals are spaced apart from each other by a predetermined distance in said first direction.

10. A thermal head for thermal recording as claimed in claim 3, wherein said plurality of leads are connected to a common conductor formed on said flexible film.

11. A thermal head for thermal recording as claimed in claim 3, wherein signal input terminals for driving said switching elements are disposed on said major surface of said semiconductor chip and are connected respectively to one end of leads having portions extending in said first direction.

12. A thermal head for thermal recording as claimed in claim 10, wherein said common conductor and said leads extend in the same direction from the same end of said flexible film.

13. A thermal head for thermal recording as claimed in claim 2 wherein said rectangular semiconductor chip is in the shape of a square.

14. A thermal head for thermal recording as claimed in claim 2 wherein the opening in said flexible film is in the shape of a slot surrounding said array of electrode terminals.

15. A thermal head for thermal recording as claimed in claim 2 wherein the opening in said flexible film is in the shape of a recess surrounding said array of electrode terminals on three sides and open on a fourth side.

16. A thermal head for thermal recording as claimed in claim 3 wherein the opening in said flexible film is in the shape of a slot surrounding said array of electrode terminals.

17. A thermal head for thermal recording as claimed in claim 15 wherein the opening in said flexible film is in the shape of a recess surrounding said array of electrode terminals on three sides and open on a fourth side.

* * * * *